June 4, 1963  L. MATVAY  3,091,920
PLASMA FLAME HYPERTHERMAL EXOTHERMIC FURNACE WITH CATALYST AND
COMBINATION THEREOF WITH AN INTERNAL COMBUSTION ENGINE
Filed Nov. 16, 1959  2 Sheets-Sheet 2
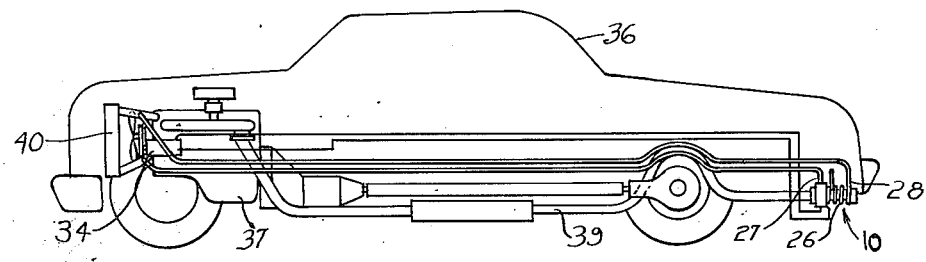
Fig_2
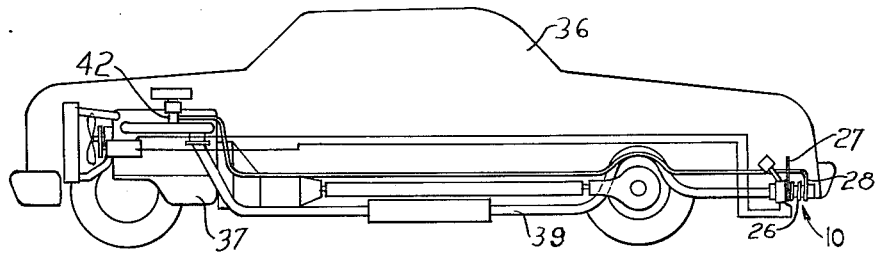
Fig_3
INVENTOR.
LEO MATVAY
BY Bosworth, Sessions,
Herrstrom & Knowles
ATTORNEYS.

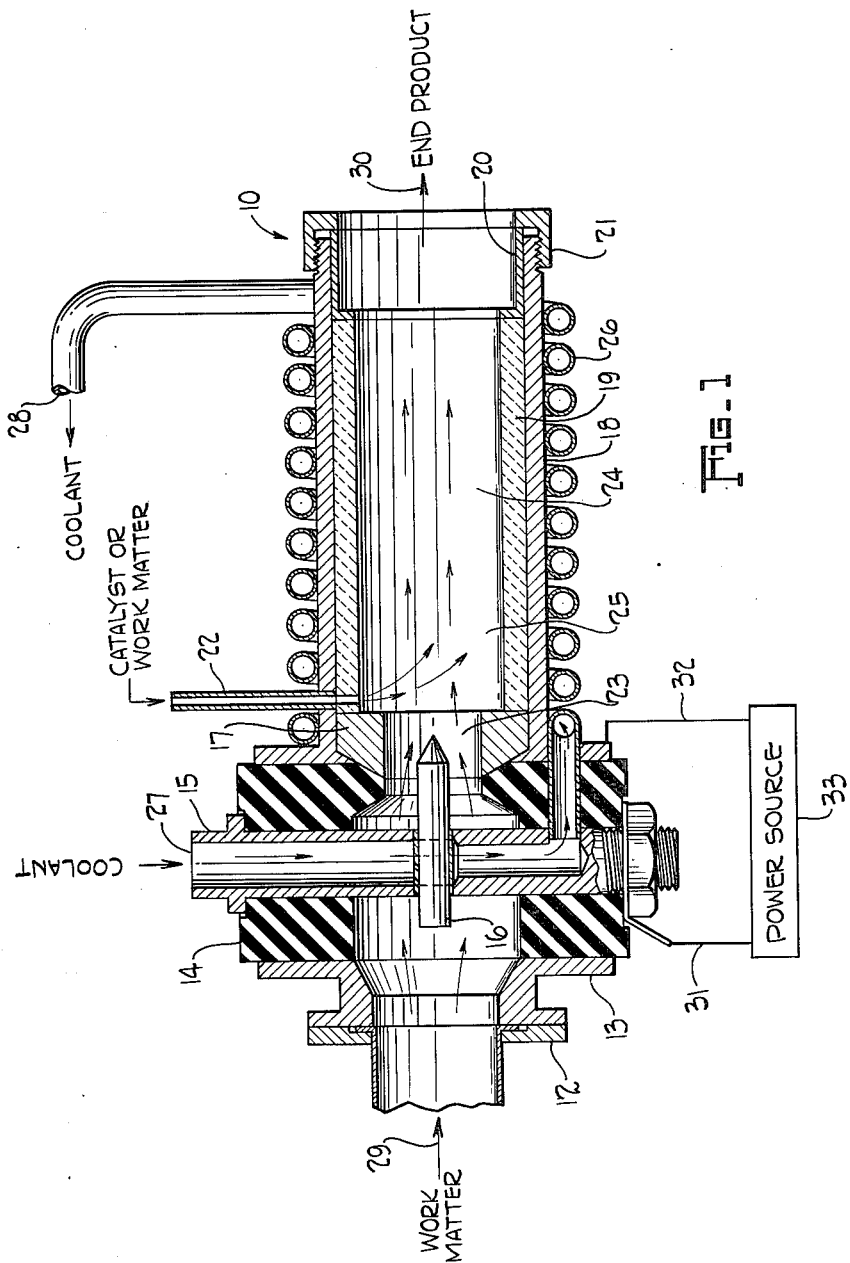

United States Patent Office 3,091,920
Patented June 4, 1963

3,091,920
PLASMA FLAME HYPERTHERMAL EXOTHERMIC FURNACE WITH CATALYST AND COMBINATION THEREOF WITH AN INTERNAL COMBUSTION ENGINE
Leo Matvay, 6708 Culver Place, Los Angeles County, Calif.
Filed Nov. 16, 1959, Ser. No. 853,131
12 Claims. (Cl. 60—30)

This invention relates to plasma flame apparatus and more particularly to a hyperthermal exothermic furnace which also employs the use of a catalytic agent.

It is an object of the present invention to provide a device for operation in the very high temperature range, hyperthermal, using a catalytic agent if required to process or refine or dissociate or decompose the work matter.

Another object of the present invention is to provide a plasma flame device where both electrodes are sufficiently and effectively cooled to make it possible to operate the device on D.C.S.P., D.C.R.P., or A.C.

Still a further object of the present invention is to provide electrodes with large cross section area to carry a high electrical current.

Still a further object of the present invention is to provide a method of introducing the work matter that is to be processed or refined or dissociated or decomposed into the furnace.

Still another object of the present invention is to provide the method of combining a catalytic agent with the refractory to act as both refractory and catalyst.

Still another object of the present invention is to provide a smog elimination device which can be produced, packaged, and sold in large quantities at a comparatively low cost, and which can be conveniently utilized on any make of automobile, truck or motorcycle.

Still a further object of the present invention is to provide a high temperature furnace which can be produced, packaged, and sold at a comparatively low cost and which can be conveniently utilized whenever needed.

Still additional objects, benefits, and advantages of this invention will become evident from a study of the following detailed description taken in conjunction with the accompanying drawing, in which:

FIGURE 1 is a view in axial section of a furance embodying a preferred form of this invention; FIGURE 2 is a schematic view showing the furnace of FIGURE 1 in combination with an internal combustion engine; and, FIGURE 3 is a schematic view showing a modified form of combination of the furnace of FIGURE 1 with an internal combustion engine.

Briefly this invention comprises providing a plasma flame hyperthermal, exothermic, furnace comprising a housing having one portion, a plasma flame generator, in which two electrodes of opposite charge and large cross-sectional area are disposed and into which work matter is introduced to form a plasma flame and a second portion, a reaction furnace, or chamber having a suitable lining such as refractory and a catalyst and being adapted to receive the plasma flame and catalytically disassociated or decompose it. Such a plasma flame furnace is particularly adapted for mounting on an automobile, truck or motorcycle, for example, to receive the engine exhaust to decompose or disasssociate the same to eliminate smog resulting therefrom. The furnace is provided with a cooling system using either a liquid or gas coolant, as desired, and is adapted for use with D.C.S.P., D.C.R.P. or alternating current.

The furnace preferably includes one or more Pitot tubes, which communicate with the second portion thereof just downstream of the nearest electrode, through which catalyst as a liquid, slurry, powder or rod and/or additional work matter may be introduced into the furnace. In addition, and/or alternatively, all or part of the catalyst is incorporated in a suitable refractory lining, such as Aluminum Company of America's X C 100 or mineral chromite, formed into the desired shape and used to line the second portion of the furnace.

The furnace is adapted for attachment to the tail or exhaust pipe of any automobile or the like to function as a smog eliminator by exposing the unburned gases, hydrocarbons, olefins, acroelins, formaldehydes, lead and nitric oxide to the high temperature of the furnace to cause them to disassociate and decompose and further to expose this work matter to the catalytic agent to render it harmless to human beings.

Further, when used as a smog eliminator on automobiles or the like, having internal combustion engines, the furnace is preferably and conveniently provided with a cooling system, which can be interconnected with the existing cooling system of the automobile, etc. or with the existing engine intake manifold to provide either a water or air cooling system for the furnace as desired, and the electrical current for the electrodes is preferably supplied by the generator commonly associated with the engine.

The catalyst is adapted to decompose nitric oxide into nitrogen and oxygen and hydrocarbons into carbon dioxide and water and preferably comprises copper oxide.

The furnace can also be used, inter alia, with a high purity inert gas as work matter entering the first portion of the furnace to provide a plasma flame to process or refine high purity, high melting temperature metals and non-metals, to disassociate ammonia added, through the Pitot tubes, as a second work matter, and be used in an atmosphere produced by adding propane through the Pitot tubes to provide a special atmosphere for the carbonization of desired products; and, with hydrocarbons in any desired form (liquid, slurry, powder or gas), with the inert gas plasma flame, as needed, to crack the hydrocarbons.

Referring now specifically to the drawing, a plasma flame, hyperthermal, exothermic furnace embodying this invention is indicated generally at 10. The plasma flame, hyperthermal, exothermic furnace 10 is preferably generally cylindrical in shape with a hollow interior and includes a flange adapter 12, by which the delivery piping, through which the inert gas, working gas, vapor or suspended solids in a conveying gas, called work matter 29, is conducted to the furnace 10, is attached to the intake adapter 13.

The electrical and heat insulator 14 has a large cylindrical hole axially aligned with the large cylindrical holes in the flange adapter 12, intake adapter 13, washer electrode 17, furnace jacket 18, refractory lining 19, spacer 20, and end cap 21.

The electrode chuck 15 is located so as to be well insulated within the electrical and heat insulator 14 to prohibit any electrical short circuiting. The rod electrode 16 is located on the axial center line by the electrode chuck 15 in the center of the axially aligned cylindrical hole of the washer electrode 17.

The washer electrode 17 is held in place against the inward flange of the furnace jacket 18 by the refractory lining 19, and the spacer 20, which in turn are all firmly held in place by the threaded end cap 21.

The Pitot tubes 22, one shown, can be located as required to introduce additional work matter 29 or a catalytic agent into the arc region 23 or into the hyperthermal exothermic reaction chamber 24 to be acted upon by the plasma flame 25.

The helical coolant coil 26 is wound around the furnace jacket 18 and is welded or brazed to it. The coolant enters at coolant inlet 27 and flows through the coolant passage in the electrode chuck 15 around the rod electrode 16 next through the coolant passage in the electrical and heat insulator 14 and then through the helical coolant coil 26 and finally out at the coolant outlet 28.

The operation of this device will now be readily understood. Under pressure inert gas such as argon or helium or other working gases or vapors or suspended solids in a conveying gas, called work matter 29, enter the plasma flame hyperthermal exothermic furnace 10 through the flange adapter 12 and intake adapter 13.

The work matter 29 flows through the axially aligned cylindrical hole in the electrical and heat insulator 14, around the electrode chuck 15, into the arc region 23. At this point, the arc region 23, the space between the rod electrode 16 and washer electrode 17, the electrical energy is transformed into heat and at the same instant as the work matter 29 passes through the arc region 23 a portion of the work matter 29 becomes ionized and thus becomes a plasma flame 25.

The plasma flame 25 and the remaining work matter 29 now have been heated. The temperature to which the plasma flame 25 and work matter 29 are raised to is dependent upon a number of physical, chemical, and electrical factors.

The dependent physical factors are such things as the space or gap between the rod electrode 16 and the washer electrode 17 which determine the electrical arc jump distance, impedance. The size of the hole in the washer electrode 17 controls the amount of constriction upon the flow of work matter 29. Therefore the smaller the hole diameter in the washer electrode 17 the greater the constriction of the work matter 29 and thus a greater concentration of heat and electrical energy.

The dependent chemical factors are such things as is the work matter 29 monatomic or diatomic or molecular in structure, is the chemical reaction of the work matter 29 exothermic or endothermic, and is the catalytic agent highly or moderately active. These chemical factors in themselves determine whether the plasma flame, hyperthermal, exothermic furnace 10 will develope temperatures of only a few hundred degrees or temperatures as high as sixty thousand degrees.

The dependent electrical factors are such things as the amount of current used and whether the electrical current is used D.C.S.P. or D.C.R.P. or A.C.

In most metals a few electrons in the outer portion of the atom are very loosely bound to the nucleus of the atom. Accordingly a metal is defined as a lender of electrons. As a result large numbers of these electrons are free to drift about in the interatomic space. However when the electrons are attracted by connecting the conductor to a electrical power source they will accelerate owing to the force of attraction but the speed attained by any individual electron will be relatively small because it will bump into one of the many atoms before it has gone far and bounce off in another direction. The energy which the electron had absorbed by reason of its acceleration is given up to the atom and appears in the form of heat.

It therefore follows from the above electron theory that where a D.C.S.P. circuit is used the electron flow, kinetic energy, is from the negatively charged electrode to the positively charged electrode and also the negatively charged electrode will remain relatively cool in comparison to the hot positively charged electrode. Therefore in a D.C.S.P. circuit the positively charged electrode will require cooling in some manner. However when a D.C.R.P. or A.C. circuit is used both electrodes must be sufficiently cooled to keep them from melting and spattering because of the high temperature concentration upon their surface and within them.

The plasma flame 25 and the work matter 29 now enter the hyperthermal, exothermic reaction chamber 24. Also at this instant in the hyperthermal, exothermic reaction chamber 24 the heated work matter 29 comes in contact with the refractory lining 19. The refractory lining 19 itself may be a catalytic agent or composed of a mixture of refractory material and catalytic agent.

Also through the Pitot tube 22 more or another work matter 29 or a catalytic agent may be introduced into the hyperthermal, exothermic reaction chamber 24 or into the arc region 23 to be processed or refined or dissociated or decomposed.

Finally the work matter 29 and other products are expelled out of the hyperthermal exothermic reaction chamber 24 as processed, refined, dissociated or decomposed products, called end products 30.

The electrical current is supplied to the plasma flame, hyperthermal, exothermic furnace 10 by way of the electrical conductors 31 and 32 from the power source 33. The power source 33 may be an electric arc welding generator or transformer or when the plasma flame hyperthermal furnace 10 is used as a smog eliminator the power source would be the automobile, truck or motorcycle generator 35, see FIGURE 2.

FIGURE 2 discloses the furnace 10 mounted on vehicle 36 to treat the exhaust gases, of internal combustion engine 37, which are conducted to the furnace 10 by suitable piping 39. Vehicle 36 also includes a conventional generator 34, which as noted above is adapted to supply power to the furnace 10 and an engine cooling system, indicated generally at 40, with which the coolant coil 26 of furnace 10 and more particularly the inlet 27 and outlet 28, respectively, are connected by suitable means indicated generally at 41.

FIGURE 3 discloses a modified combination of furnace 10 with vehicle 36 and engine 37 in which the coolant coil of the furnace is connected with the intake manifold 42 of the engine and the air is drawn into the manifold through inlet 27, coil 26, outlet 28 and interconnecting piping means 43.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. In combination an internal combustion engine, an engine exhaust system for said engine, an electric current generator driven by said engine, and a plasma flame, hyperthermal, exothermic furnace for treating the exhaust gases from said engine, said furnace comprising a housing having a hollow interior with intake and discharge ends, said intake end of said housing being interconnected with said exhaust system and receiving the exhaust gases from said engine, said furnace comprising a plasma flame generator portion and a reaction chamber portion, said generator portion receiving the gases entering through said intake end, first and second electrode means in said generator portion, means connected with said electric current generator for passing an electric arc between said electrodes to act upon at least a portion of the said gases entering through said intake opening to generate a plasma flame, said reaction chamber portion being disposed intermediate said generator portion and said discharge end and being interconnected with said generator portion and discharge end to receive the plasma flame and gases associated therewith and to discharge through said discharge end, catalyst means disposed in said reaction chamber portion to have functional contact with said plasma flame and gases to disassociate all or part thereof into constituent parts.

2. The combination according to claim 1 in which said plasma flame furnace also comprises means for cooling at least a portion thereof.

3. The combination according to claim 2 in which said engine has a cooling system and said plasma furnace cooling means is interconnected therewith.

4. The plasma flame, hyperthermal, exothermic furnace according to claim 2 in which said cooling means has a liquid coolant.

5. The combination according to claim 2 in which said engine has an intake manifold, and said plasma furnace cooling means has air as a coolant and is interconnected with said intake manifold.

6. A plasma flame, hyperthermal, exothermic furnace comprising a housing having a hollow interior with an intake end for the introduction of work matter and a discharge end, said furnace comprising a plasma flame generator portion and a reaction chamber portion, said generator portion receiving work matter entering through said intake end, first and second electrode means in said generator portion, means connected with a suitable power source for passing an electric arc between said electrodes to act upon at least a portion of said work matter to generate a plasma flame, said reaction chamber portion being disposed intermediate said generator portion and said discharge end and being interconnected with said generator portion and discharge end to receive said plasma flame and residual work matter associated therewith, and to discharge through said discharge end, and catalyst means disposed in said reaction chamber portion to have functional contact with said plasma flame and work matter to treat at least a portion thereof.

7. A plasma flame, hyperthermal, exothermic furnace as set forth in claim 6 having at least one transversely extending Pitot tube providing access to said reaction chamber portion, at least a portion of said catalyst being introduced into said reaction chamber portion through at least one said Pitot tube.

8. The plasma flame, hyperthermal, exothermic furnace according to claim 6 having at least one transversely extending Pitot tube providing access to said reaction chamber portion in which at least a portion of the work matter to be treated in said furnace is introduced into said reaction chamber portion through at least one said Pitot tube.

9. The plasma flame, hyperthermal, exothermic furnace according to claim 6 with means for cooling at least one said electrode.

10. The plasma flame, hyperthermal, exothermic furnace according to claim 9 in which said cooling means also cools said reaction chamber portion.

11. The plasma flame, hyperthermal, exothermic furnace according to claim 6 in which said reaction chamber portion has a refractory lining and at least a portion of said catalyst is disposed within and forms a part of said refractory lining.

12. A plasma flame, hyperthermal, exothermic furnace according to claim 6 in which said electrodes have a substantially large cross-sectional area whereby to carry a high electric current.

References Cited in the file of this patent

UNITED STATES PATENTS

| | | |
|---|---|---|
| 1,347,631 | Herck | July 27, 1920 |
| 1,789,812 | Frazer | Jan. 20, 1931 |
| 2,038,567 | Ittner | Apr. 28, 1936 |
| 2,071,119 | Harger | Feb. 16, 1937 |
| 2,203,554 | Uhri et al. | June 4, 1940 |
| 2,649,685 | Cohen | Aug. 25, 1953 |
| 2,678,261 | Ruth | May 11, 1954 |
| 2,686,399 | Stoltz | Aug. 17, 1954 |
| 2,728,408 | Deliman | Dec. 27, 1955 |
| 2,771,736 | McKinley | Nov. 27, 1956 |
| 2,819,423 | Clark | Jan. 7, 1958 |
| 2,880,079 | Cornelius | Mar. 31, 1959 |
| 2,922,869 | Giannini | Jan. 26, 1960 |
| 2,937,490 | Calvert | May 24, 1960 |